United States Patent
Stern (10) Patent No.: US 8,097,111 B2
(45) Date of Patent: Jan. 17, 2012

(54) METHOD AND APPARATUS FOR ENCODING LABELS

(75) Inventor: Mitchell G. Stern, Centerville, OH (US)

(73) Assignee: Avery Dennison Corporation, Pasadena, CA (US)

(*) Notice: Subject to any disclaimer, the term of this patent is extended or adjusted under 35 U.S.C. 154(b) by 1106 days.

(21) Appl. No.: 11/701,994

(22) Filed: Feb. 2, 2007

(65) Prior Publication Data

US 2008/0186175 A1    Aug. 7, 2008

(51) Int. Cl.
*B29C 65/48* (2006.01)
*B32B 37/00* (2006.01)
*B32B 38/14* (2006.01)
*B32B 43/00* (2006.01)
*G06Q 99/00* (2006.01)
*G01N 33/02* (2006.01)

(52) U.S. Cl. ............ 156/277; 426/232; 705/28; 705/22; 705/23

(58) Field of Classification Search ................ 156/277, 156/350, 351, 378, DIG. 47; 702/99, 104, 702/130–132, 136, 182, 188; 340/286.09, 340/500, 501, 825.06, 515, 517, 615, 622; 426/231–233, 109, 110, 113; 705/22, 23, 705/28
See application file for complete search history.

(56) References Cited

U.S. PATENT DOCUMENTS

| | | | |
|---|---|---|---|
| 5,149,211 A * | 9/1992 | Pettigrew et al. | 400/88 |
| 5,181,521 A * | 1/1993 | Lemelson | 600/549 |
| 5,483,624 A | 1/1996 | Christopher et al. | |
| 5,486,259 A | 1/1996 | Goodwin et al. | |
| 6,000,845 A * | 12/1999 | Tymkewicz et al. | 374/155 |
| D486,512 S | 2/2004 | Arnold et al. | |
| 7,520,668 B2 * | 4/2009 | Chen | 374/121 |
| 7,621,216 B2 * | 11/2009 | Jacobs et al. | 101/111 |
| 2004/0100380 A1 * | 5/2004 | Lindsay et al. | 340/540 |
| 2005/0261991 A1 * | 11/2005 | Kennamer | 705/28 |

OTHER PUBLICATIONS

TN9 Infrared Thermometer Module Users Manual; Revision Jul. 20, 2004; ZyTemp, Taiwan, R.O.C.
MLX90614 family Single and Dual Zone Infra Red Thermonmeter in TO-39; Melexis Microelectonic Integrated Systems; Data Sheet Sep. 14, 2006 Rev 1.0 pp. 1 through 35.

* cited by examiner

*Primary Examiner* — Singh P Chan (57) ABSTRACT

There is disclosed method and apparatus for encoding labels with information relating to temperature, life expectancy and/or discard dates and times of products such as perishable items. A hand-held portable printer mounts a thermometer which can sense the temperature of an item and the printer can print a label bearing the sensed temperature and/or other related data.

11 Claims, 6 Drawing Sheets

METHOD AND APPARATUS FOR ENCODING LABELS

CROSS-REFERENCE TO RELATED APPLICATION

The following co-owned U.S. patent application relates to date coding of perishable items, namely, Ser. No. 11/546,234 filed Oct. 11, 2006.

Another co-owned U.S. patent application is Ser. No. 11/383,363 filed May 15, 2006 now U.S. Pat. No. 7,609,406.

FIELD OF THE INVENTION

This relates to the field of encoding labels in general and to encoding information relating to perishable items in particular.

BACKGROUND

The following documents are made of record: U.S. Design Pat. D486,512; U.S. Pat. No. 5,483,624; U.S. Pat. No. 5,486,259; and TN9 Infrared Thermometer Module User Manual, Rev. Jul. 20, 2004, Zy Temp, Taiwan, R.O.C; and MLX90614 family Single and Dual Zone Infra Red Thermometer in TO-39, pages 1 through 35, Aug. 14, 2006 Microelectronics Integrated Systems E-Mail: Sales_usa@melexis.com.

It is known in the food industry to provide time and date coding of perishable items. Items on store shelves typically cannot be sold after their expiration dates and are to be discarded. Providing and updating labels on items so that the label reflects the proper expiration date, however, can be a time consuming task. The task of providing an accurate expiration date is made more difficult when faced with products that may be stored at temperatures other than expected or intended or that may include variations in ingredients.

The taking of the temperature of food products is known.

The provision of a hand-held portable printer applicator having a bar code scanner and a thermometer capable of taking the temperature of products to print a label with the temperature of a product recorded thereon was conceived by a party other than applicant.

SUMMARY

In an embodiment, the discard date and/or time may be inputted by the user by keying in information. In another embodiment, the printer's microprocessor may be provided with look-up tables that include expected shelf-life for the items to be encoded in relation to temperature and the discard date may be printed on the label by the printer. Depending on the configuration, the hand-held portable printer may also include additional modules with functionality such as wireless communication abilities and/or an ability to read and/or to write to RFID tags and/or scan bar codes.

In another embodiment, a method of encoding labels uses a printer with an on-board microprocessor and a thermometer, wherein the improvement comprises storing shelf-life information of a plurality of perishable items based on initial temperatures, taking the temperature of a perishable item, calculating the end-of-shelf-life time and date for the item of which the temperature was taken, and printing a label bearing the end-of-shelf-life time and date.

This summary is provided to introduce concepts in a simplified form that are further described below in the Detailed Description. The summary is not intended to identify key features or essential features of the claimed subject matter, nor is it intended to be used to limit the scope of the claimed subject matter.

DETAILED DESCRIPTION

Figure 1:
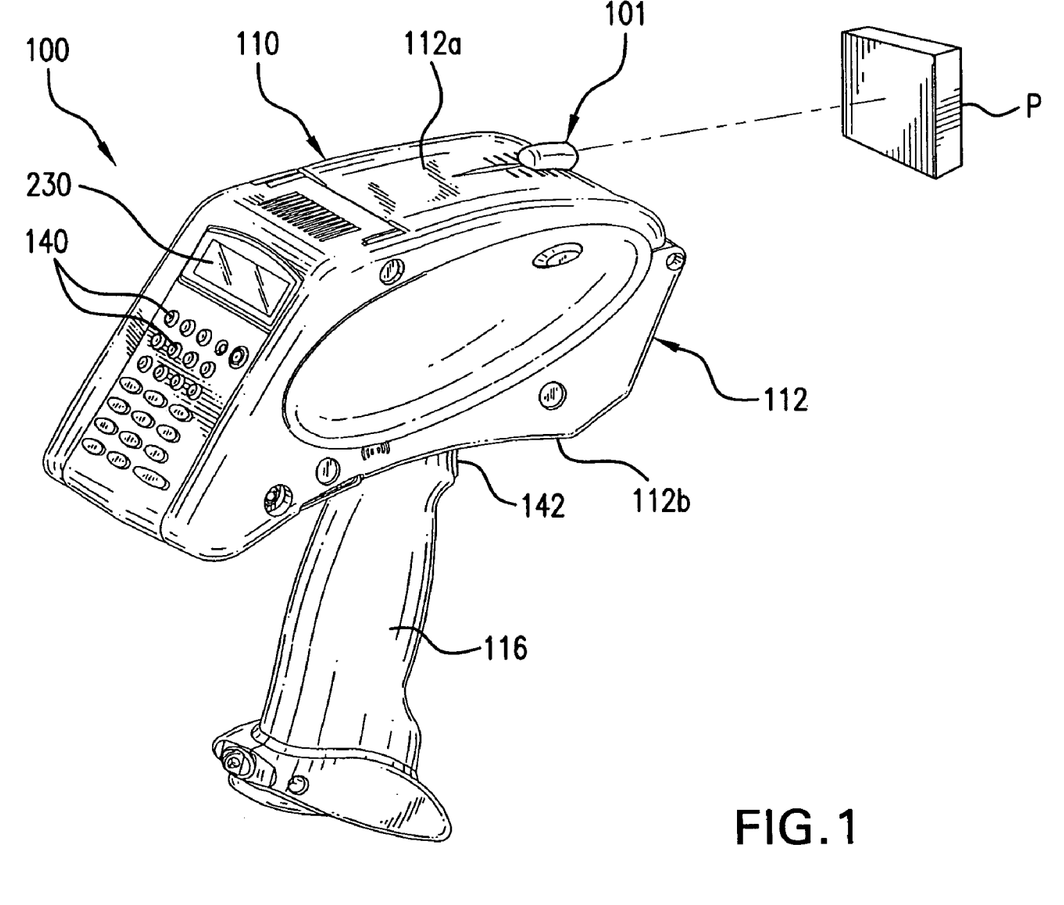
FIG. 1 is a pictorial view of a hand-held portable printer shown taking the temperature of an item.
Figure 4:
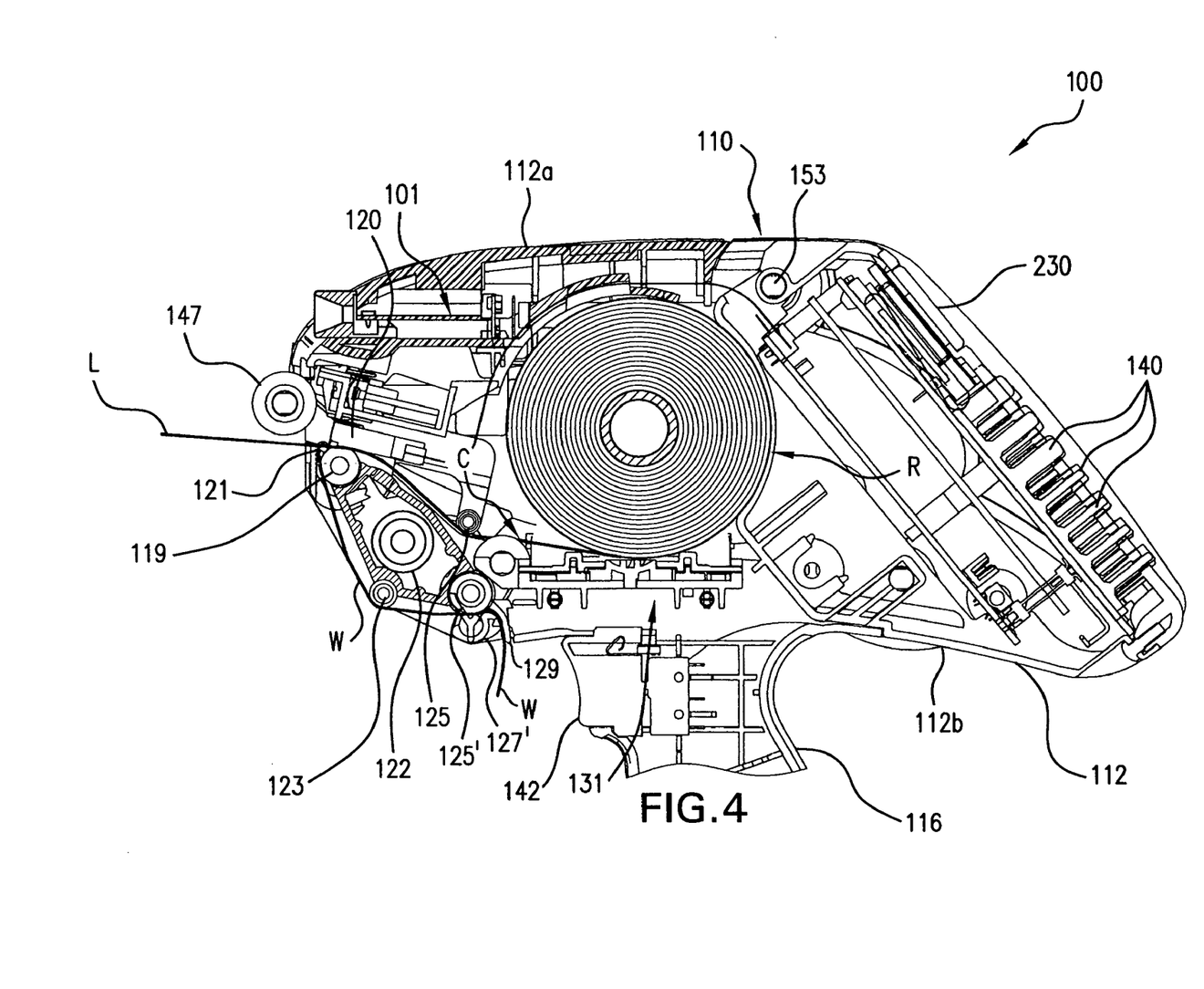
FIG. 4 is a sectional view of the hand-held portable printer also shown in FIG. 1.

With reference initially to FIGS. 1 and 4, there is shown an encoder 100 including a hand-held portable thermal label printer 110. The printer 110 includes a hand-held portable housing 112 that mounts a roll R of a composite label web C comprised of a carrier web W to which labels L are releasably adhered. The composite web C can pass from the roll R beneath a roller 125 to between a platen roll 119 and a cooperating thermal print head 120 to print on the labels L. An electric motor 122 drives the platen roll while the print head 120 prints. The platen roll 119 advances the composite label web C to and beyond the platen roll 119 to a delaminator 121. As the carrier web W makes a sharp bend about the delaminator 121, the leading label L projects from the front of the printer herewith and in label applying relationship to an applicator 147 shown to be in the form of an applicator roll. The carrier W passes from there to and partially around a direction changing roll 123, from there the web W passes between a feed roll 125' driven by the motor 122 and a back-up roll 127', and from there the web 10 passes out of the printer 110 through an exit opening 129. As shown, the roll R is mounted in a space within the housing on a label roll holder 131. The housing 112 includes a movable upper housing section 112a and a lower housing section 112b to which a handle 116 is attached. The handle 116 contains a battery for powering the motor 122, a thermometer 101, the print head 120, and a display 144. The upper housing section 112a is pivotable relative to the lower housing section 112b about a pivot 153. While a thermal printer 110 is illustrated, other types of printers can be employed. A keyboard or keypad 140 is used to enter data and to control a menu and the display 144 display data and selectable instructions, prompts and the like.

The front portion of the upper housing section 112a mounts the thermometer 101. In an illustrative embodiment, the thermometer may be of the infrared type, although other types can be used if desired. It is preferred that the thermometer have a narrow field of view so that variations in the temperature readings be kept to a minimum if the distance between the thermometer and the item of which the temperature is being taken varies. FIG. 1 illustrates the hand-held portable encoder 100 including the printer 110 and the thermometer 101 being aimed at an item such as a perishable food item P. The perishable item can be anything the temperature of which needs to be reused and recorded or further manipulated. A typical food item would be processed or unprocessed vegetables, meats, sauces and food items in general.

It is readily apparent that an illustrative embodiment comprises a unitary hand-held, portable encoder 100 which integrates temperature sensing, printing and control functions. As will be appreciated from the following details, additional features may be added as desired.

Figure 2:
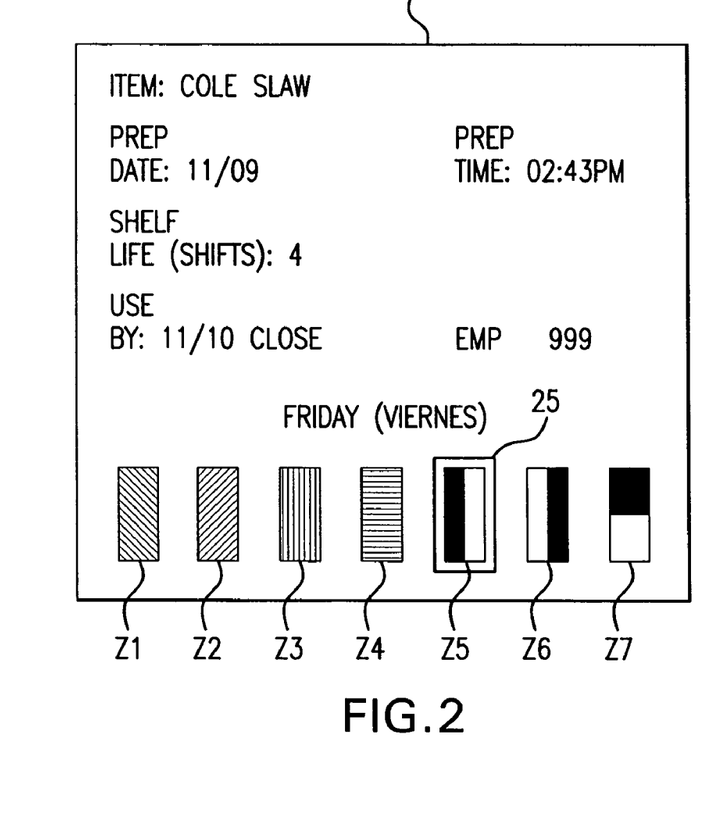
FIG. 2 is a top plan view of a printed label according to one mode.
Figure 3:
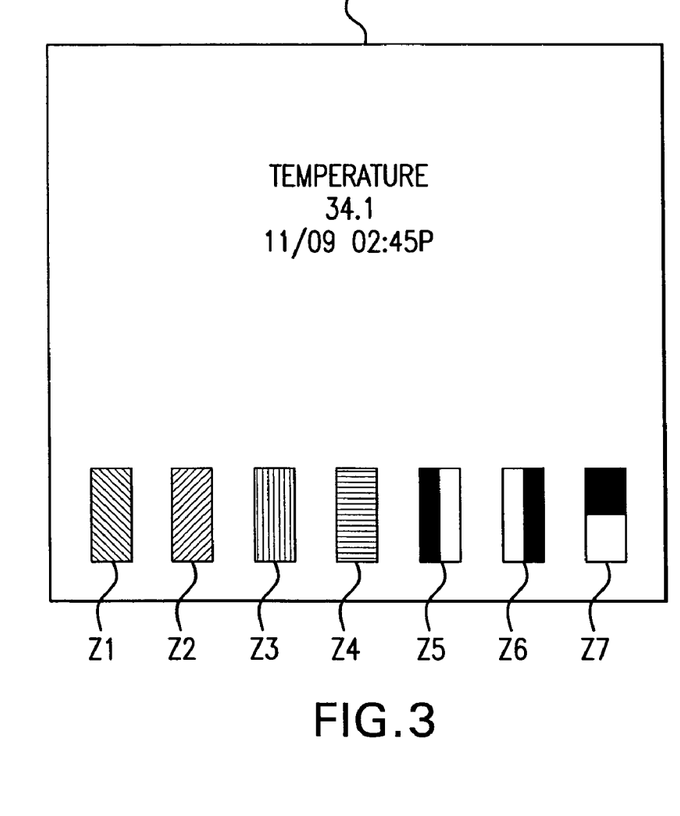
FIG. 3 is a top plan view of a printed label according to another mode.

The encoder 100 can be programmed to take the temperature of the item P upon pressing a trigger or trigger switch 142, and thereupon the printer can print a label L such as the label L shown in FIG. 2 or FIG. 3. If desired, the encoder 100 can be programmed to print a plurality of labels L, for example, and that label L can be applied to the item P and another might be applied to a log, ledger or other document for record purposes.

The label L of FIG. 2 carries preprinting 102 in differently colored zones Z1 through Z7 in the colors blue, yellow, red, brown, green, orange and black respectively, for the respective days Monday, Tuesday, Wednesday, Thursday, Friday, Saturday and Sunday represented in the drawings by different shading or hatching. The remainder of the printing seen in FIG. 2 can be printed by the printer 110 when the trigger 142 is depressed, namely, the selected item such as "ITEM: COLE SLAW" as are "PREP DATE: 11/09", "PREP TIME: 02:43 PM", "SHELF LIFE (SHIFTS): 4", "USE BY: 11/10 Close", "EMP 999" and "FRIDAY (VIERNES)" and a box 25 is printed around mark Z5 for example, to visually indicate Friday.

The label L of FIG. 3 can use the same label L as shown in FIG. 2, if desired, however, the color marks Z1 through Z7 are not used in this instance. The label L of FIG. 3 is printed by the printer 110 with the designations "TEMPERATURE", "34.1", "11/09 and "02:45 PM" indicating that the temperature of the item is 34.1° F., that the temperature was sensed or taken on November 9 at 2:45 PM.

By way of example, not limitation, one such thermometer 101 that may be used is a TN9 thermometer module by ZyTemp located at IF, No. 3 Industrial E. $9^{th}$ Rd., Science-Based Industrial Park, Hsin Chin, Taiwan, R.O.C. and described in their TN9 Infrared Thermometer Module User Manual, Rev. Jul. 20, 2004, however, any suitable thermometer may be used. Alternatively, another thermometer that may be used is the MLX 90601 family of Microelectronics Integrated Systems further identified above under "Background".

Figure 5:
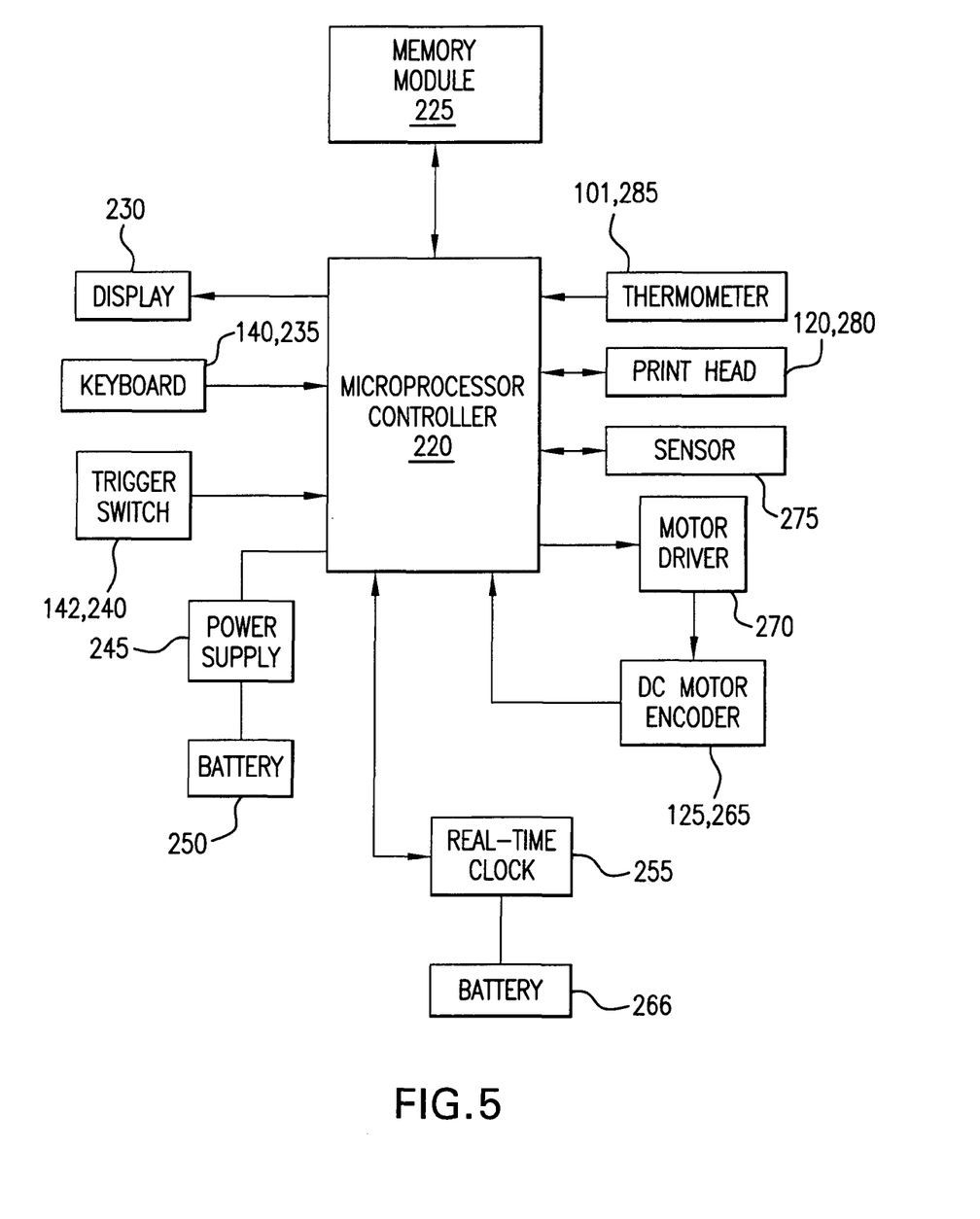
FIG. 5 is a block diagram of an embodiment of an encoder.
Figure 6:
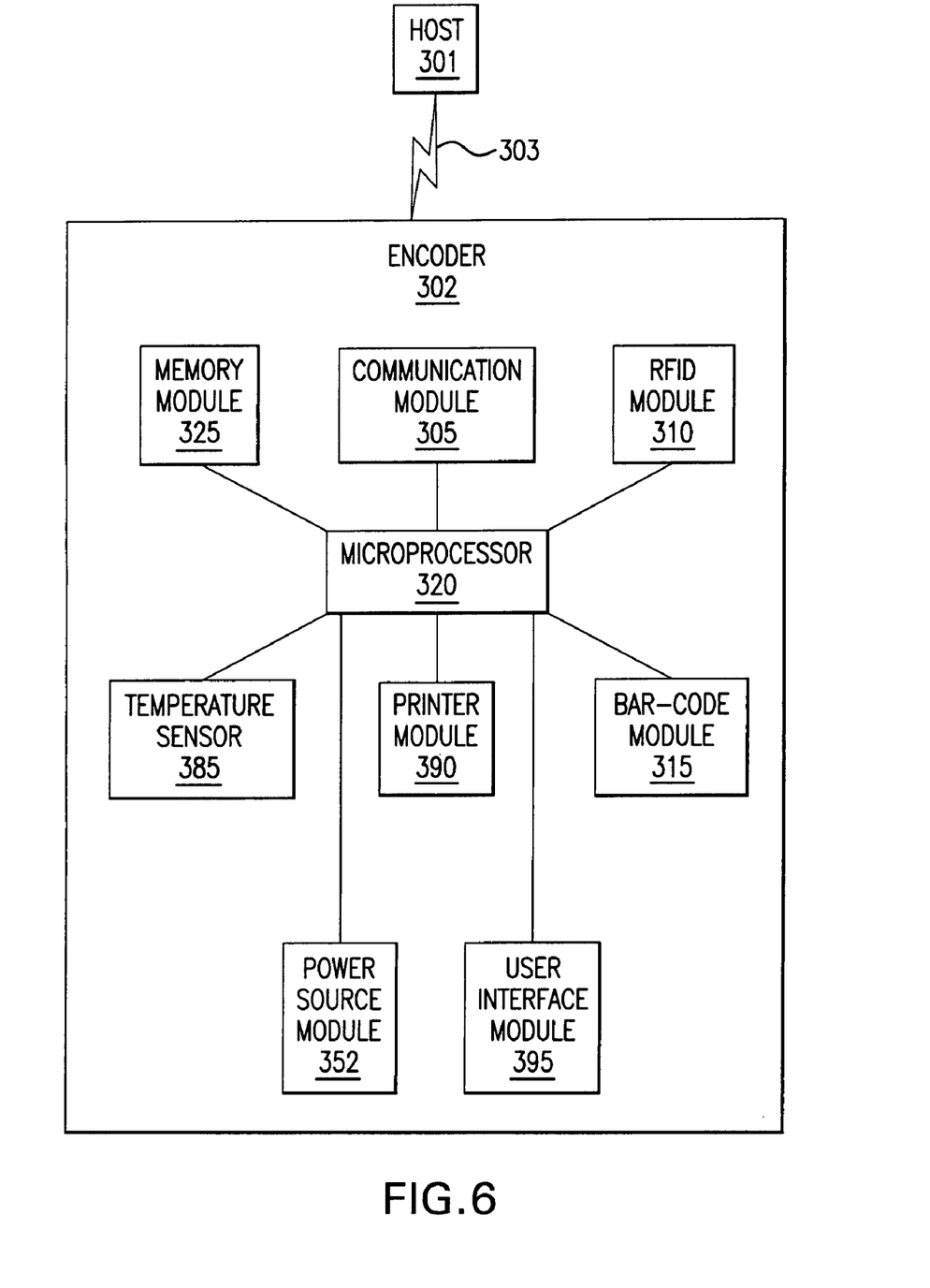
FIG. 6 is another block diagram of an embodiment of an encoder.

Looking at FIG. 5-6, schematics of embodiments of encoders 100 are depicted. FIG. 5 discloses various details of an embodiment of an encoder while FIG. 6 illustrates a more generic schematic representation of an encoder. However, details from either figure can be combined with details from the other so as to provide the configuration that is desired.

Looking at FIG. 5, a microprocessor controller 220 is coupled to a memory module 225. As is known in the art, the memory module 225 can be fixably or removably coupled to the microprocessor 220. In addition, the memory module 225 may be volatile or non-volatile as well as read only memory or read/writable memory. Furthermore, the memory module may include a combination of the different memory configurations so as to optimize performance and battery life. For example, without limitation, a portion of the memory module may be relatively fast volatile memory such as DRAM while computer instructions may be stored in a non-volatile memory such as flash memory. In addition a portion of the memory module may be provided remotely, and in an embodiment where the encoder includes wireless communication ability, be accessed via wireless communication.

The microprocessor controller may be configured to cause symbols such as text to be rendered on a display 230 and to receive input from a keyboard 140 or 235. The keyboard 140 or 235 may be as depicted in FIG. 1 and may be any desirable type of keyboard that is typically found on portable devices. For example, without limitation, in an embodiment the keyboard 235 may include some function keys and some alphanumeric keys, such as is common on portable devices such as cellular phones (and as is shown in FIG. 1).

The trigger switch 142 or 240, which may be shaped as a conventional trigger (see FIG. 1) or have some other shape, provides an input to the microprocessor controller 220. In response to the input, the microprocessor obtains a temperature reading from the thermometer 285. The thermometer 101 or 285 may be any suitable model, such as the examples provided above and, in an embodiment, can determine the temperature of an item without the need to physically touch the item that is being checked.

The microprocessor controller 220 receives the temperature reading from thermometer 101 or 285 and may determine, as will be discussed below, a shelf-life for the product. Based on the current time, which may be provided by real-time clock 255, the microprocessor may determine output for a label that represents shelf-life estimation. The microprocessor controller 220 then provides instructions to a sensor 275, a motor driver 270 and a print head 120 or 280 so as to create a label in a known manner, based on feedback received from a DC motor encoder 125 or 265. As noted above with respect to FIG. 2, blank labels may include a set of symbols and graphics prior to being printed upon so that the printing takes place in a faster manner and provides a label with color images without the need for a more expensive printing solution. Alternatively, the label may be blank and the print head 120 or 280 may print the entire label, either in black and white or in color, depending on the desired properties of the resultant label (and the print head 280).

To power the microprocessor controller, a power supply 245 may be coupled to a power source such as battery 250, which may be rechargeable. Real-time clock 255 may be powered by a separate battery 260. An advantage of this dual battery functionality is that a real time clock may keep accurate time for an extended period of time using a relatively small battery. Thus, the encoder may avoid the need to frequently set the current time. At the same time, the battery 250 may be used until it is run down before being charged. To further improve utilization, the battery 250 may be replaceable so that a user can swap out a first battery 250 for a second battery 250 and continue to use the encoder with the second battery 250 while the first battery 250 is being recharged. Naturally, the batteries 250 and 260 could also be combined.

FIG. 6 illustrates a schematic representation of an encoder 302 in communication with host 301 via communication link 303. The host 301 may be any desirable computer, such a personal computer (PC) or server, provided locally or in a remote location. Furthermore, the communication link may be direct or include one or more intermediate devices, such as is common in networks. The communication link 303 may transmit data in a wired or wireless manner between host 301 and the communication module 305. As is known, wireless communication modes may utilize standard protocols such as, without limitation, WiFi and the like, as well as proprietary standards. Wired communication links may similarly use proprietary or known protocol standards such as, without limitation, USB, FireWire or Ethernet, as desired.

The microprocessor controller 320, which may be a combination of processors working in parallel or series, uses the communication module to communicate with the host. In an embodiment this may allow the host 301 to modify software and data stored on the memory module 325. The encoder 302 is powered by the power source module 352, which may be a combination of two or more distinct power sources that are separately replaceable. In this regard, it should be noted that while batteries are currently considered advantageous from a performance versus cost comparison, other power sources types such as fuel cells, capacitors, and the like may also be used.

When a trigger input is received from the user interface module 395, the microprocessor controller may provide instructions to temperature sensor 385 to detect the temperature of a selected product. Based on known properties of the product, which may be stored in a memory module 325 (the memory module 325 may be configured as discussed above), the microprocessor controller 320 may determine a shelf-life for the product and may print out a label indicating a use-by or sell-by time using the printer module 390. In an embodiment, the microprocessor controller 320 may use the communication module 305 to provide a signal to the host 301 indicating the temperature of the product. As can be appreciated, this may be useful in quality control checks of inventory.

As can be appreciated from FIG. 6, the encoder 302 may also include addition functionality. For example, modules such as an RFID module 310 and a bar code scanner or module 315 may be mounted on the front end of the housing 112, for example, at the portion shown in FIG. 4 of U.S. Ser. No. 11/383,363 filed May 15, 2006 in combination with the temperature sensor 385 and the data in the memory module 325. U.S. application Ser. No. 11/383,363 discloses additional details regarding the functionality of modules such as RFID module 310 and bar code module 315 and is incorporated by referenced herein by reference in its entirety. In general, however, an RFID module 310 may be configured to read and write to RFID tags and a bar code module 315 may be configured to scan bar codes. Furthermore, microprocessor controller 220 can also be configured to cause the printhead 280 (FIG. 5) to generate bar codes. It can be appreciated that the design of the encoder 302 (compared to the configuration depicted in FIG. 4) may need to be modified if additional modules are to be included.

Figure 7:
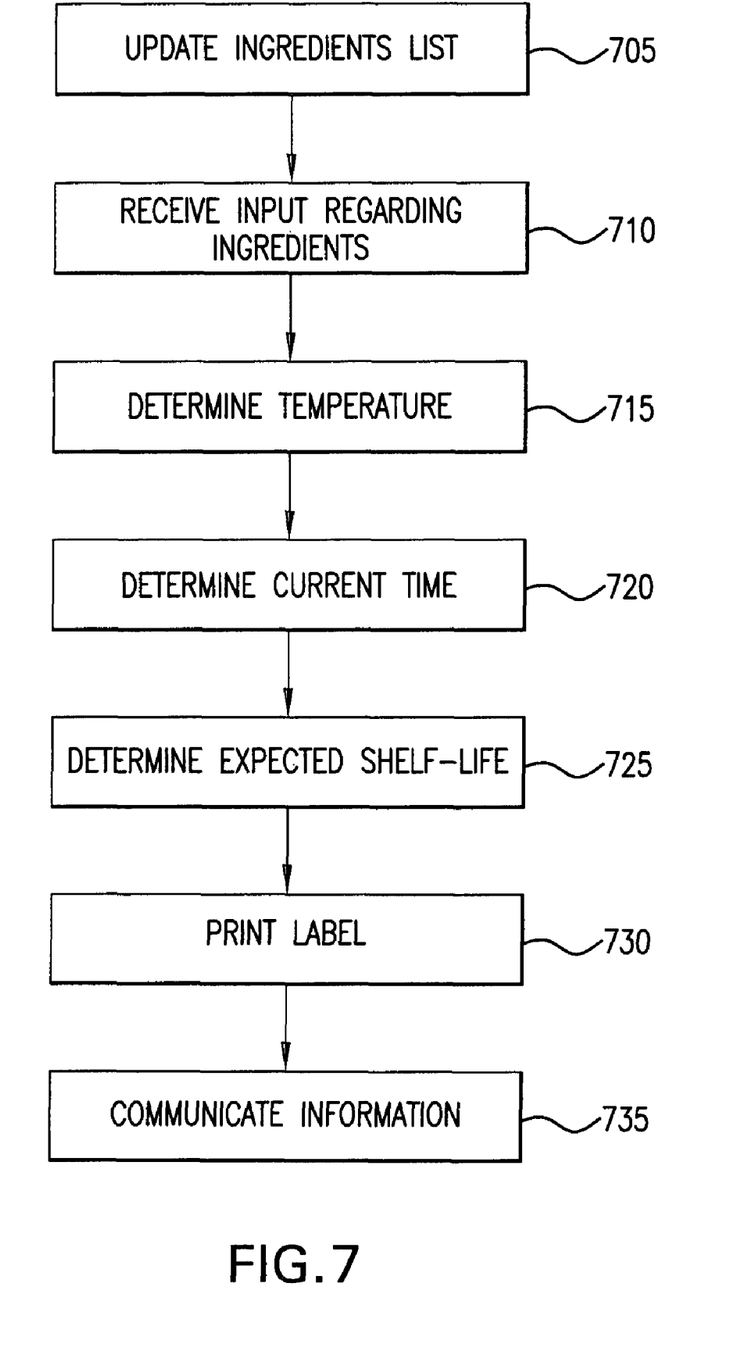
FIG. 7 is flow chart relating to a method and apparatus for determining shelf-life of a product.

Turning to FIG. 7, a flow chart illustrating steps for using an encoder is depicted. It should be noted that one or more of the illustrated steps may be omitted and that additional steps may also be added, depending on system configurations.

In step 705, the ingredients list is updated. This updating of the ingredients list may take place in the host 301 (FIG. 6) or directly in the encoder 302. For example, a user may add or change ingredients and/or products by inputting data directly into the encoder 302 with the user interface module 395. To allow for ease of use, the ingredients can be arranged in a hierarchal manner, although other configurations are also possible. For example, a first level may provide a general classification of products, such as deli, seafood and the like. A second layer may include more specific examples, such as potato salad or shellfish. Further levels of specificity are also possible. For example, potato salad could include ingredients such as mayonnaise, potato etc. . . . while shellfish could include ingredients such as oyster and lobster. The organization of the ingredients could be flatter or deeper, depending on the preference of the person setting up the organization of products.

In step 710, input is received regarding the type of product that is about to be tested. In an embodiment, a user may actuate a selector on the user interface module 395 that causes a hierarchy of ingredients to be rendered on display 230 (which is also part of the user interface module 395) and move through the levels (as appropriate) until the desired ingredient is selected. In another embodiment, the bar code module 315 or the RFID module 310 may be used to determine the ingredients based on a predetermined association between a value corresponding to a particular bar code or RFID tag and a product with known ingredients. For example, a bar code can be scanned and the resultant bar code data may be determined to represent a particular product or item. A look-up table stored in the memory module 325 may then be used to determine what ingredients are associated with the product.

In step 715, the temperature of the product may be determined. In an embodiment, this can be caused by the user actuating a trigger in the user interface module 395. In an alternative embodiment, the use of one of the modules such as bar code module 315 may trigger the temperature sensor 385 after providing a signal to the user and waiting a predetermined period. The determined temperature can then be stored in the memory module 325.

In step 720, the current time may be determined. This can be accomplished by querying the real-time clock 255 and obtaining a current value. In an alternative embodiment, the storing of the determined temperature can automatically include a time and date that the temperature was determined. Other methods of determining the current time, such as querying an external device are also possible.

In step 725, the expected shelf life may be determined based on the current temperature of the product and the known ingredient(s) (and their known shelf life at certain temperatures). This can be done with a look-up table that includes temperature and a corresponding expected shelf-life for each product and/or ingredient. As can be appreciated, certain products that include a number of ingredients will be limited to a shelf-life controlled by the ingredient with the shortest shelf-life. Therefore, in an embodiment, the shelf-life of each product can be determined based on a single ingredient. However, because it is possible to use different ingredients to make similar products, it may be beneficial to allow the user to first select a product and then select several ingredients that are included in that particular product so that a more accurate estimation of shelf-life can be provided.

As can be appreciated, the expected shelf life is a prediction based on certain assumptions regarding the future storage temperatures. For example, chicken can be expected to have a particular shelf-life at a given temperature. While elevating the temperature of the chicken for a period of time may have an effect on the shelf life of the chicken, subsequently reducing the temperature can be expected to modify the shelf-life. Similarly, increasing the temperature of an item (placing a frozen item in a refrigerator, for example) typically reduces the shelf-life. Therefore, one possible method of determining the expected shelf-life is to assume the current temperature of the product is representative of the future temperature and will be maintained. Another possible method is to base the shelf-life on the current temperature and the expected future storage temperature(s) so as to get a more accurate estimate of the product's shelf-life. For example, a frozen product that was sitting in a refrigerator (as apposed to a freezer) and slowly thawing might be expected to have a longer shelf life then a similar product that was not previously frozen and was also sitting in the same refrigerator section. Thus, depending on the preference of the person providing the shelf-life, the initial and ending conditions can be adjusted to better match the actual real-world practices. In this way, more accurate estimation of expected shelf-life can be provided.

Of course, the method of estimating shelf-life may also vary according to the product. For example, products with potential safety considerations may use more conservative expected shelf-life estimation while products whose shelf-life are limited simply because the desirability of the product to the consumer is reduced over time may use a more precise shelf-life estimation. While an almost unlimited number of variations are possible, it may be useful to provide a safety-factor so as to ensure the use-by time or the sell-by time for each product always complies with health and safety guidelines as well as the quality guidelines of the product provider.

In step 730, a label may be printed that indicates the end-of-shelf-life of the product that had its temperature taken. As noted above, the label may include graphics prior to the printing process so that the printing can consist of marking or selecting one of the included graphics to provide a visual of the expiration date and, for example, providing an indication of whether the expiration time/date is a sell-by or use-by time/date. In an alternative embodiment, the label may be blank and all the graphics and details of the label, including bar code data if desired, can be added to the label during the printing process. It should be noted that in an embodiment, the printing of the label may be automatically done in response to the end-of-shelf-life determination. In an alternative embodiment, the label may be printed in response to a user request.

In step 735, the information regarding end-of-shelf-life may be communicated to the host. While this step is optional, the information may be communicated by a wireless connection or a wired connection. In an alternative embodiment, all or a portion of the memory module may be removable and can be physically transported to the host 301 for data retrieval, storage and analysis purposes. As can be appreciated, this may allow for improved inventory control and may also be used to provide feedback regarding stock inventory levels so that the appropriate restocking tasks are initiated.

Other embodiments and modifications of the invention will suggest themselves to those skilled in the art, and all such of these as come within the spirit of this invention are included within its scope as best defined by the appended claims.

I claim:

1. Method of encoding labels with a hand-held portable printer having a hand-held portable housing and a print head capable of printing labels,
    wherein a print head and a thermometer that does not physically touch a product are mounted on the hand-held portable housing, the method comprising:
    determining an end-of-shelf-life for a product based on a shelf-life controlled by the ingredient with a shortest shelf-life, a temperature, and the nature of the product, and
    printing a label with an indication of the end-of-shelf life expectancy.

2. Method of encoding labels with a hand-held portable printer having a hand-held portable housing,
    with a thermometer that does not physically touch an item and an on-board microprocessor controller storing shelf-life information of a plurality of perishable items based on initial temperatures,
    wherein the print head and thermometer are mounted on the hand-held portable housing, the method comprising:
    taking the temperature of a perishable item,
    calculating the end-of-shelf-life time and date for the item based on the temperature taken and on a shelf-life controlled by the ingredient with a shortest shelf-life, and
    printing a label bearing the end-of-shelf-life time and date.

3. Method of encoding a label with a hand-held portable printer having a hand-held portable housing and a print head capable of printing labels,
    wherein a print head and a thermometer that does not physically touch a product are mounted on the hand-held portable housing, the method comprising:
    the method comprising:
    receiving input regarding an ingredient of a product;
    determining the temperature of the product with a the thermometer;
    determining an end-of-shelf-life for the product based on a shelf-life controlled by the ingredient with a shortest shelf-life and the temperature; and
    printing a label indicating the end-of-shelf-life and/or a bar code.

4. The method of claim 3, wherein the step of receiving input comprises receiving a selection of an ingredient from a user interface module.

5. The method of claim 3, wherein the step of receiving input comprises:
    scanning a bar code label to obtain bar code data; and
    determining ingredients associated with the bar code data.

6. The method of claim 3, wherein the label includes individual color graphics each representing different days of a week and the printing comprises marking the color graphic that representative the day to which that the end-of-shelf-life corresponds.

7. The method of claim 3, wherein the step of determining the end-of-shelf-life comprises:
    determining an expected shelf-life for the ingredient based on the determined temperature and a look-up table;
    determining a current time; and
    determining the end-of-shelf-life based on the expected shelf-life and the current time.

8. The method of claim 3, wherein the step of printing the label is done automatically in response to the determining of the end-of-shelf-life.

9. The method of claim 3, wherein the step of printing the label including providing an indication of the user causing the label to be printed.

10. The method of claim 3, wherein the step of receiving input comprises:
    scanning a RFID chip to determine the product type; and
    determining at least one ingredient associated with the product type.

11. The method of claim 10, wherein the determining the at least one ingredient comprises wirelessly querying a remote host to obtain information regarding the at least one ingredient.

* * * * *